Aug. 4, 1964   P. H. DOWLING ETAL   3,142,987
SEMICONDUCTOR THERMOMETER
Filed Aug. 13, 1962                                2 Sheets-Sheet 1

INVENTORS
M. POLESHUK
P. H. DOWLING
BY
Frank R. Trifari
AGENT

United States Patent Office 3,142,987
Patented Aug. 4, 1964

---

3,142,987
SEMICONDUCTOR THERMOMETER
Philip H. Dowling, White Plains, and Michael Poleshuk, Irvington, N.Y., assignors to North American Philips Company, Inc., New York, N.Y., a corporation of Delaware
Filed Aug. 13, 1962, Ser. No. 216,457
14 Claims. (Cl. 73—362)

This invention relates to a semiconductor thermometer employing the breakdown characteristic of a junction as the temperature sensing mechanism, and to methods of measuring temperature with said thermometer.

Semiconductor thermometers have been heretofore suggested in the art. A typical device utilizes the resistivity of the semiconductor as the thermal-sensing characteristic. As is well-known, in accordance with the standard band theory of semiconductors, the liberation of free carriers which contribute to the conductivity of the semiconductor varies with the ambient temperature. As the temperature decreases, fewer free carriers are generated, and thus the resistivity of the semiconductor increases with decreasing temperature. The measurement made is of the current through the semiconductor as a function of the ambient temperature.

A more recent thermometer employs as the sensing element a transistor, and the relationship utilized is the collector current of the transistor and its variation as a function of temperature. The technique employed is to maintain the collector current constant by varying the base bias as the temperature changes. Measurement of the base bias indicates the temperature at which the transistor exists. A related thermometer employs a diode which is forward-biased and whose current varies with temperature. The measurement involves variation of the forward voltage to maintain the diode current constant, with the voltage thus established being an indication of the diode temperature.

The foregoing thermometers suffer mainly in the low sensitivity of their measurements, in the difficulty in measuring accurately the minute voltage changes, and from inaccuracies stemming from surface influences on the active element.

Our improved semiconductor thermometer utilizes an entirely different property as the thermal-sensing mechanism. We have found that the voltage at which certain junctions break down is a very stable function of temperature. While there have been indications in the prior art of a connection between junction breakdown and temperature, the actual relationship was obscure, hidden by other dominating mechanisms, and as far as we know it had never before been appreciated that not only will breakdown of certain junctions reproducibly occur at a precise voltage related to the junction temperature, but, more important, the sensitivity of that temperature-related breakdown can be extraordinarily high, and remains so over an extraordinarily large temperature range, extending principally from room temperature down to the vicinity of absolute zero. Thus, our thermometer offers a number of important advantages over the prior art thermometers.

These features of the invention and others which are believed to be new will now be described in greater detail with reference being made to the accompanying drawings, in which.

Figure 1:
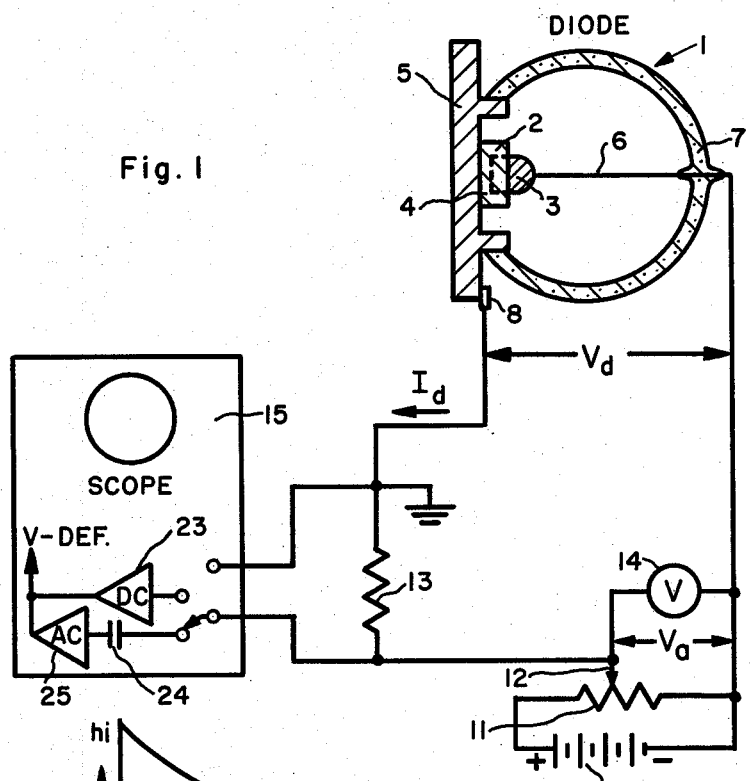
FIG. 1 is a schematic view of one form of thermometer in accordance with our invention.

FIG. 1 illustrates schematically one form of semiconductor thermometer in accordance with our invention. The thermometer comprises a semiconductor device 1 containing a junction whose breakdown is a stable function of temperature. The device 1 comprises a n-type semiconductor wafer 2 on the surface of which has been alloyed an impurity-bearing metal mass 3 to form inside the wafer a p-n junction 4. The semiconductor wafer 2 may be of germanium, and the alloying mass 3 of indium. The wafer is soldered onto a thermally conductive metal base 5, which may be of copper, and lead-in conductor 6 soldered to the indium pellet 3. After these operations, the resultant device is subjected to a careful etching treatment to remove any surface inhomogeneities, and then the combination enclosed in an insulating envelope 7, shown as a simple hermetically sealed glass enclosure. A lead 8 is attached to the base 5. The lead 6 constitutes a connection to a p-type germanium region established in the wafer by recrystallization, forming a p-n junction 4 with the unaltered n-type body regions, to which the lead 8 is conductively connected. The base 5 is then applied to the region, element or structure whose temperature is to be measured to establish an intimate, thermally conductive connection thereto. A source of voltage 10 is provided in parallel with a potentiometer 11 at whose movable tap 12 is thus available a variable D.C. voltage. That voltage Va, is applied across the p-n junction through a series resistor 13, which may have a value of 5000 ohms. The voltage applied across the junction is symbolized by Vd. The variable source voltage Va can be measured by a voltmeter 14 connected between the potentiometer tap 12 and one side of the voltage source 10. The base 5 of the diode is grounded. An oscilloscope 15 of high sensitivity and wide bandwidth is connected across the series resistor 13 to measure or indicate the current through the junction. As will be noted, the voltage applied across the junction 4 is in the reverse direction.

In operation, the potentiometer tap 12 is varied, thus varying the voltage applied in the reverse direction across the junction 4 until the oscilloscope indicates, by a characteristic pattern to be described hereinafter, that the junction 4 has broken down. The voltage measured by the voltmeter 14 is then read and the temperature of the diode and its local environment may be derived by calibration, i.e., by comparison against the voltages measured at known temperatures.

We have found that the onset of breakdown, an anomalous condition in the reverse current-voltage characteristic of certain junction diodes exhibiting generally a sharp breakdown knee, which anomalous region is characterized by a series of current pulses, commonly referred to as "noise," is a stable function of temperature. Stated otherwise, the voltage at which a preselected group of current pulses is established within a given junction has a fixed and reproducible relation to the temperature of the junction, and the establishment of these preselected noise pulses and the measurement of the reverse voltage at which they result, enables an accurate determination to be made of the temperature of the junction. When the semiconductor is intimately contacted to a region or structure whose temperature it is desired to learn, then that temperature is accurately determined using as the sensing mechanism the aforementioned voltage at which this breakdown phenomenon is encountered.

These noise pulses have been studied before by others in this art. They had observed, as we have, that certain semiconductor junctions, which generally exhibit a sharp breakdown, and when biased in the reverse direction and the reverse voltage-current characteristic displayed dynamically on an oscilloscope adequate to resolve the pulses, at the knee of the reverse characteristic just before the current increases sharply, a series of current pulses are observed on the face of the oscilloscope. These pulses are uniformly flat topped, and have extremely sharp rise and decay times; hence the desirability of a scope with high resolving power. As the voltage is slightly increased, the ON-time of the pulses increases. At the end of a range of about one-half volts, the current becomes steady—the pulses vanish—and thereafter continues to increase with increasing voltage. However, while the pulses exist and the current is discontinuous, it is generally of the order of 20 microamperes, and thus practically no heating of the junction occurs, the significance of which will be explained later.

The origin of these pulses has been attributed to free charge carriers thermally generated within or near the depletion region adjacent to the junction formed by the reverse biasing. It is believed that the thermally generated carriers are accelerated by the high electric field in the depletion layer, and are multiplied by cumulative collision ionization similar to the Townsend avalanche in a gas discharge. It is believed that the noise pulses occur when the biasing establishes a sufficiently large electric field in the depletion region to produce cumulative collision ionization but localized in the junction region near where the free carriers are established or have drifted. These localized avalanches have also been described as "microplasmas." When the electric field achieves a higher level, high current levels are established without individual current pulses and which also produce appreciable junction heating which is disadvantageous from the standpoint of our invention. For the purpose of our invention, it is desirable that a semiconductor device be present in which one microplasma can be established and observed or detected.

In carrying out the invention, a semiconductor device is provided exhibiting the aforesaid property, namely, that at some reverse voltage a microplasma can be established accompanied by current pulses, and a preselected quality of these noise current pulses is ascertainable. The device is then thermally contacted to the structure or space whose temperature it is desired to measure, a voltage applied to the device to reverse bias its junction, and the voltage increased or decreased as the case may be until the desired microplasma is produced and operation thus established in this anomalous region, and a preselected quality of the current pulses established and maintained, and then the voltage at which these phenomena occur is determined. By suitable calibration, that determined voltage gives an accurate measure of the desired temperature. We have been able to read temperatures to 0.1° C. down to 20° K. This sensitivity is remarkable. What is even more remarkable is that this extraordinary high sensitivity exists over an extremely large temperature range extending from near absolute zero up to room temperature. Thus, a single thermometer can now be provided capable of measuring with very high accuracy an enormously wide temperature region, a highly advantageous property of our thermometer.

Figure 2:
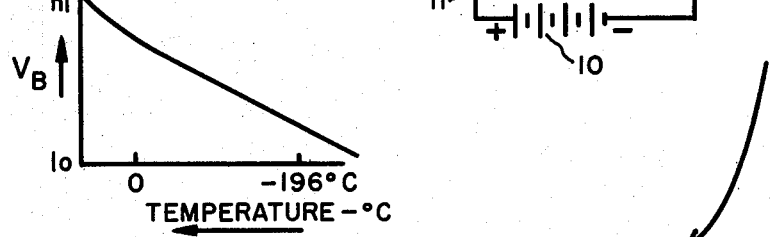
FIG. 2 is a graph showing the variation of breakdown voltage with temperature.

FIG. 2 shows how the breakdown voltage, $V_B$, varies with temperature. A sensitivity of about 0.1 volt/° C. was measured at −253° C. with apparatus illustrated in FIG. 1, and a similar sensitivity was measured at room temperature.

Figure 4:
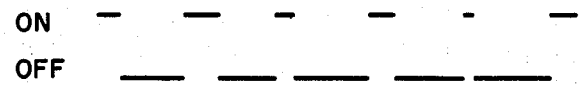
FIG. 4 illustrates the oscilloscope display for a low voltage in the breakdown range.
Figure 5:
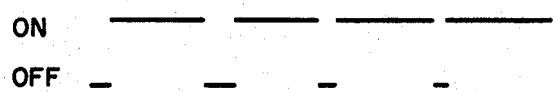
FIG. 5 illustrates a similar display at a higher voltage.

It will be appreciated that the reverse current of a junction often contains a major component due to surface leakage. At room temperature or above, the surface leakage may obscure the onset of breakdown. Thus for temperature measurements at or above room temperature, care should be exercised to minimize this surface leakage, which can be done by appropriate surface treatments and proper encapsulation. However, when the temperature falls below about −10° C., the surface leakage is effectively suppressed and the onset of breakdown can be accurately determined. As previously explained, the breakdown that actually takes place does not occur over the whole junction area, but only at a minute "breakdown center" where there is an inhomogeneity, either of crystal structure or of impurity doping, which breakdown is termed a microplasma at the breakdown center. In order to properly correlate the detected breakdown voltage to the actual temperature, it is essential that the same operating point in the breakdown range be determined. There are a number of different ways in which this may be done. Before describing these, reference is made to FIG. 3, which is the voltage-current characteristic of the device illustrated in FIG. 1. In this graph, the voltage, $Vd$, which is the actual junction voltage, is plotted along the abscissae as a function of current amplitude of the junction current pulses which is plotted along the ordinate for a constant temperature. As the voltage across the junction is increased from zero, below a point indicated by reference numeral 17, no current pulses are observed on the oscilloscope. Only a D.C. back current is measured which is negligible. It will be appreciated that the vertical deflection circuits of the oscilloscope are connected across the series resistor 13, and an internal horizontal sweep adequate to resolve the pulses, say between 10 milliseconds and 0.1 microsecond per centimeter of horizontal sweep, is utilized in the horizontal deflection circuit. At or just above the voltage represented by the point 17, a series of pulses are suddenly observed. These are square-topped with very rapid rise and decay and of random widths. Their amplitude is constant so long as the temperature and the source voltage are constant. Between the point referred to by numeral 17 and a slightly higher voltage corresponding to the point 18, the pulse amplitudes are difficult to measure because of their short duration and their fast rise and decay. When the point 18 is reached, the pulses are readily observable on the oscilloscope screen, and a typical appearance is illustrated in FIG. 4. The lower level of lines labelled OFF represents an OFF condition of substantially zero current flow. The upper level of lines labelled ON represent the pulse durations. Because of the short rise and fall times, the connecting electron beam traces are invisible. As will be observed, the average ON-time is substantially less than the average OFF-time of the pulses. As the applied voltage continues to increase, the pulses increase in amplitude and the average ON-time becomes longer relative to the average OFF-time. FIG. 5 illustrates the oscilloscope pattern when the voltage has reached a level corresponding to the point 19. When a point 20 is achieved, the current is continuous and separate pulses are no longer discernible. To better appreciate this, some typical measured values are as follows: With a diode made with 1.6 ohm-cm. n-type germanium on which an indium pellet of about 0.2 mm. in diameter is alloyed at 550° C., and subsequently etched electrolytically, and with the resultant device maintained at a temperature of −196° C., the voltage range defined by points 18 and 19 i.e., the lowest voltage at which the pulse amplitudes can be measured and that at which the ON-time becomes infinite, is about four-tenths volt and the pulse amplitude at some midpoint indicated by the point 21 in FIG. 3 is about 20 microamps at a diode voltage $Vd$ of 50.2 volts.

Figure 3:
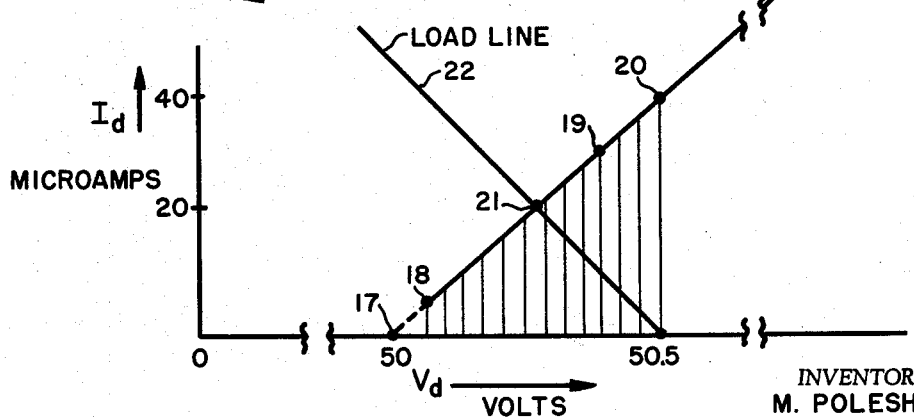
FIG. 3 is a graph illustrating the reverse characteristic of the diode in the apparatus of FIG. 1, which will be observed when the applied voltage from the source 10 is varied continuously from zero to above the breakdown voltage.

The operation of the circuit illustrated in FIG. 1 may be better understood by drawing a load line 22 in the graph of FIG. 3. The load line 22 has a slope equal to the value of the resistor 13 and an intercept on the abscissae equal to the source voltage V*a*. The interception of this load line 22 with the diode characteristic before described determines the operating point and character of the breakdown. As the applied voltage V*a* is varied, the load line moves up or down, parallel to itself, and the interception or operating point moves along the diode characteristic curve. Alternatively, if the applied voltage is maintained constant but the temperature varies, the diode characteristic moves up or down parallel to itself again changing the interception or operating point and the breakdown character. In this latter case, the original character of the breakdown can be restored by varying the applied voltage.

In our invention, in order to maintain the proper values of temperature correlation, the same interception or operating point in the range between points 17 and 20 in FIG. 3 must be established and measured. This can be done in various ways within the scope of the invention. As one possibility, a predetermined value of pulse amplitude corresponding to a selected operating point in the anomalous region may be selected and determined by means of the oscilloscope display, using an external or internal D.C. amplifier 23. In an alternative way, a fixed average ON-time to OFF-time ratio of the pulses can be utilized to reproduce the same operating point. A sensitive technique for accomplishing this, which is our preferred mode because of its extreme sensitivity, is to introduce a capacitor, which may be, for example, 0.01 microfarads, in series in the oscilloscope coupling to the resistor 13. As a matter of fact, the regular internal coupling capacitor 24 of the oscilloscope's A.C. amplifier 25 is suitable for this purpose. By adjusting the the source voltage V*a* so that the pulse pattern displayed is symmetrical about the zero oscilloscope axis, an average ratio of unity is readily determined. As a modification of this technique, an A.C. voltmeter can be substituted for the oscilloscope. When this voltmeter reaches a maximum, the average ON-time to OFF-time ratio is unity. In both of the above cases, the time constant of the A.C. voltmeter, which must respond only to alternating current, or that of the oscilloscope, should be large since it is only the average ratio which is maintained.

As a further alternative, a predetermined average D.C. current can be chosen and measured by means of a simple microammeter in series with the diode 1, and the applied voltage V*a* adjusted to maintain constant the preselected D.C. current.

The foregoing techniques illustrate ways for selecting precisely the same operating point along the range of the diode characteristic between onset of the breakdown and continuous current flow. Once that point has been established, the remaining problem to achieve the accuracy of which the thermometer is capable is to accurately measure the applied source voltage, V*a*. This can be readily done. For example, there are commercially available voltmeters which will read 50 volts, say, to millivolts.

Figure 6:
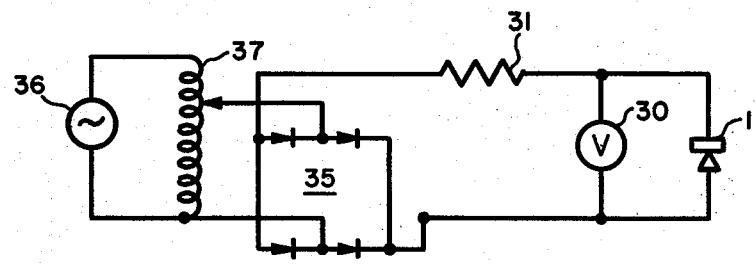
FIG. 6 is a circuit diagram of another form of thermometer in accordance with our invention.

While for high accuracy an oscilloscope is preferred for precise location of the chosen breakdown point along the diode characteristic, for coarser temperature indications a simple circuit involving only one meter may be adequate. FIG. 6 illustrates a suitable circuit. The temperature-sensing breakdown diode is again referred to by reference numeral 1, and a voltmeter 30 is connected across the diode 1. In series with a limiting resistor 31 is a full-wave rectifier 35 which is connected across an A.C. voltage source 36 via a variable ratio transformer 37 for varying the A.C. voltage applied to the rectifiers 35. Rectified A.C. is thus applied across the temperature-sensitive diode 1. Thus, the diode voltage swings continuously between zero and some maximum value, which is adjusted at the transformer 37 just to exceed the breakdown voltage represented by the point 21 in FIG. 3. This point will be determined by the characteristic of the voltmeter. As the applied voltage varied by the transformer 37 is increased and the peak rectified voltage crosses the voltage value represented by the point 21, the voltmeter 30 across the diode suddenly fails to increase with the applied voltage, and this point is taken as the selected breakdown voltage value.

It may happen that on successive cycles, the voltage across the diode will rise by varying amounts above the value represented by point 21 before breakdown occurs, thus producing an uncertainty in the value of the selected breakdown voltage. This possibility may be especially prevalent at the lower temperatures, which is attributable to the absence of free carriers in the vicinity of the breakdown center to trigger breakdown even if breakdown conditions are present. This is readily obviated by shining light of low intensity onto the diode semiconductor element, which, being photosensitive, provides the necessary triggering carriers. Ordinary room illumination may be adequate for this purpose. Thus, in this embodiment it is desirable that the diode envelope or encapsulation be transparent. A transparent enclosure may also be desirable for similar reasons for the diode in the apparatus of FIG. 1, when very low temperatures are to be measured.

Figure 7:
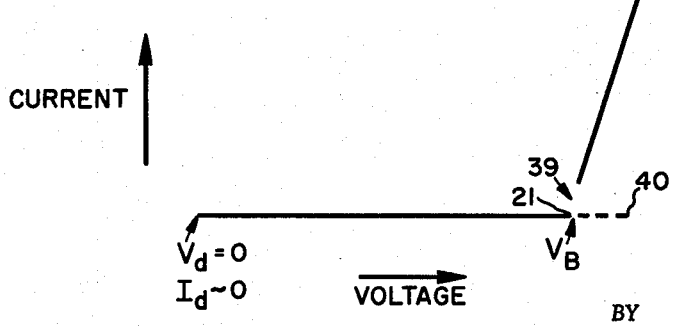
FIG. 7 is a graph to illustrate the operation of the apparatus diagrammed in FIG. 6.

The manner of operation of this circuit may better be understood by reference to FIG. 7, which represents the dynamic voltage-current diode characteristic displayed on an oscilloscope whent he peak applied voltage exceeds the an oscilloscope when the peak applied voltage exceeds the breakdown voltage represented by the point 21. Because of the scale and the rising and falling voltage traversing the breakdown region, no pulses are normally observed, but the current appears to suffer a discontinuity 39 at the breakdown voltage point 21. This occurs approximately where D.C. measurements in the circuit of FIG. 1 would show an average ratio of ON-time to OFF-time of unity, and is indicated by the sudden failure of the voltmeter to increase as the applied voltage is increased. The uncertainty described above is represented in FIG. 7 by the dashed line between points 21 and 40.

Devices with which the invention may be practiced will be found among the diodes exhibiting sharp breakdown characteristics. For satisfactory operation, they should be tested dynamically with a 60 cycle A.C. sweep tracer to demonstrate the presence of the breakdown pulses. Commercially available diodes, such as Amperex type Nos. OA10, OA47, OA7, have proved satisfactory, but for best results the semiconductor elements used in these commercial units should be encapsulated in enclosures having a thermally-conductive portion for obtaining a satisfactory thermal contact with the region or article whose temperature is to be measured. Some of the diodes tested exhibited very high frequency breakdown pulses. For these devices, if the apparatus of FIG. 1 is used, equipment capable of resolving very fast rise time, small-signal pulses should be employed for best results.

Satisfactory devices can also be separately manufactured as hereinbefore described. Other semiconductor materials, e.g., silicon, are also usable, as are other techniques for establishing the p-n junction. Desirably, a single inhomogeneity or breakdown center is provided in the junction region. This may be accomplished after the pellet alloying operation by plural etching steps, which remove active centers near the junction edge and thus tend to activate another in the interior whose properties are more favorable. With high quality crystals, a center may be introduced by locally deforming the crystal lattice, such as by exerting pressure over a very small area or by deliberately producing a small area of high doping. The latter may be achieved by masking off all but a small surface region of the semiconductor and then diffusing impurities into the unmasked surface a second time, or by alloying a minute speck of a suitable doping material into the surface. Care should be exercised to maintain the surface leakage current at its lowest possible value.

In this way, temperatures above room temperature can also be measured.

In addition to the high sensitivity and wide temperature range, our thermometer exhibits the further advantages that the device volume is small, so that little space is required for probing the temperatures of various articles. Further, the breakdown involved is non-destructive, and thus reasonable lifetime will be experienced. Due to the small currents in the breakdown pulses, very fine leads can be used. Also, this means that no appreciable heating of the device occurs due to current flow. Otherwise, the device would be indicating not the desired temperature of the environment but its own increased temperature, which would be unacceptable.

While we have described our invention in connection with specific embodiments and applications, other modifications thereof will be readily apparent to those skilled in this art without departing from the spirit and scope of the invention as defined in the appended claims.

What is claimed:

1. A method of measuring temperature, comprising providing at the region of temperature to be measured a semiconductor body containing a junction exhibiting breakdown at a prescribed reverse voltage value which is a stable function of the junction temperature and exhibiting the further characteristic that at the onset of breakdown pulses of current traverse the junction at current values below that value at which appreciable heating of the junction occurs, applying to the semiconductor body across the junction a reverse voltage having a magnitude at which a preselected quality of the said current pulses is established, and determining the magnitude of said reverse voltage producing the said selected current pulses thereby to obtain an accurate indication of the temperature of said region.

2. A method of accurately measuring temperature, comprising providing at the region of temperature to be measured and in good thermal contact therewith a semiconductor body containing a p-n junction exhibiting breakdown at a prescribed reverse voltage value which is a stable function of the junction temperature and exhibiting the further characteristic that at the onset of breakdown pulses of current traverse the junction at current values below that value at which appreciable heating of the junction occurs, the duration of said current pulses varying with the reverse voltage over a narrow voltage range, applying to the semiconductor body across the junction a reverse voltage having a magnitude at which a preselected quality of the said current pulses is established, determining the magnitude of said reverse voltage producing the said preselected current pulses, and comparing said determined voltage magnitude with the voltage determined at a known temperature thereby to obtain an accurate indication of the temperature of said region.

3. A method as set forth in claim 2 wherein the preselected quality of said current pulses established is their amplitude.

4. A method as set forth in claim 2 wherein the preselected quality of said current pulses established is a fixed average ratio of the ON-time of the pulses of their OFF-time.

5. A method as set forth in claim 2 wherein the preselected quality of said current pulses established is an average ON-time to OFF-time ratio of unity.

6. A method as set forth in claim 2 wherein the preselected quality of said current pulses established is a selected average D.C. current level.

7. A method of accurately measuring temperatures over a wide temperature range extending from the vicinity of absolute zero to room temperature, comprising providing at the region of temperature to be measured a semiconductor body containing a p-n junction exhibiting sharp breakdown at a prescribed reverse voltage value which is a stable function of the junction temperature and exhibiting the further characteristic that at the onset of breakdown pulses of current traverse the junction at current values below that value at which appreciable heating of the junction occurs, the duration of said current pulses varying with the reverse voltage over a narrow voltage range, applying to the semiconductor body across the junction a reverse voltage having a magnitude at which the said current pulses are established with an average preselected duration, and determining the magnitude of said reverse voltage producing the preselected duration of current pulses thereby to obtain an accurate indication of the temperature of said region.

8. A semiconductor thermometer comprising a semiconductor junction, means for applying across the junction a voltage in the reverse direction including means for varying the magnitude of the said voltage, said junction exhibiting the characteristic that at a prescribed reverse voltage value which is a stable function of the junction temperature, pulses of current traverse the junction at current values below that value at which appreciable heating of the junction occurs, and means for determining the voltage at which a preselected quality of the said current pulses is established to thus obtain an accurate indication of the junction temperature.

9. A semiconductor thermometer as set forth in claim 8, wherein the last-named means includes an oscilloscope capable of resolving individual current pulses.

10. A thermometer as set forth in claim 9 wherein the oscilloscope has a capacitor coupled input.

11. A semiconductor thermometer comprising a semiconductor p-n junction, means for applying across the junction a voltage in the reverse direction including means for varying the magnitude of the voltage and means for measuring the magnitude, said junction exhibiting the characteristic that at a prescribed voltage value which is a stable function of the junction temperature, pulses of current traverse the junctions at current values below that value at which appreciable heating of the junction occurs, the duration of said current pulses varying with to the applied voltage over a narrow voltage range, and means enabling the magnitude of the reverse voltage to be adjusted to a value establishing substantially the same relative pulse durations, whereby the measured magnitude gives an accurate indication of the ambient junction temperature.

12. A thermometer as set forth in claim 11 wherein the last-named means enables the establishment of an average equal ON-time to OFF-time ratio for the said pulses.

13. A thermometer as set forth in claim 12 wherein the last-named means comprises an A.C. reading voltmeter.

14. A semiconductor thermometer comprising a semiconductor p-n junction, means for applying across the junction a voltage sweeping between zero and a value in the reverse direction, including means for varying the magnitude of said reverse voltage, said junction exhibiting the characteristic that at a prescribed voltage value which is a stable function of the junction temperature, pulses of current traverse the junctions at current values below that value at which appreciable heating of the junction occurs, the duration of said current pulses varying with the applied voltage over a narrow voltage range, and a voltmeter connected across the said junction, whereby the magnitude of said reverse voltage at which the voltmeter fails to increase as the said magnitude is being increased is an indication of the ambient junction temperature.

References Cited in the file of this patent

UNITED STATES PATENTS

| | | |
|---|---|---|
| 2,696,739 | Endres | Dec. 14, 1954 |
| 2,996,918 | Hunter | Aug. 22, 1961 |
| 3,102,425 | Westman et al. | Sept. 3, 1963 |

UNITED STATES PATENT OFFICE
CERTIFICATE OF CORRECTION

Patent No. 3,142,987

August 4, 1964

Philip H. Dowling et al.

It is hereby certified that error appears in the above numbered patent requiring correction and that the said Letters Patent should read as corrected below.

Column 1, line 41, after "changes" insert -- involved --; column 3, line 70, after "with" insert -- the --; column 6, line 28, strike out "an oscilloscope whent he peak applied voltage exceeds the"; column 7, line 60, for "of their" read -- to their --.

Signed and sealed this 24th day of November 1964.

(SEAL)
Attest:

ERNEST W. SWIDER
Attesting Officer

EDWARD J. BRENNER
Commissioner of Patents